United States Patent

[11] 3,599,738

| | | |
|---|---|---|
| [72] | Inventor | Chester H. Wickenberg<br>164 Division, Elgin, Ill. 60120 |
| [21] | Appl. No. | 18,836 |
| [22] | Filed | Mar. 12, 1970 |
| [45] | Patented | Aug. 17, 1971 |

[54] PORTABLE LETTER POSTAGE SCALE
6 Claims, 3 Drawing Figs.

[52] U.S. Cl. .................................................. 177/126, 177/216
[51] Int. Cl. ...................................................... G01g 21/00
[50] Field of Search ........................................... 177/126, 216, 224

[56] References Cited
UNITED STATES PATENTS

| | | | | |
|---|---|---|---|---|
| 822,804 | 6/1906 | Willis ........................ | | 177/216 |
| 1,518,982 | 12/1924 | Harrold ....................... | | 177/216 X |
| 1,573,869 | 2/1926 | Sanders ...................... | | 177/216 X |
| 2,022,753 | 12/1935 | Woodward .................. | | 177/216 |
| 2,646,979 | 7/1953 | Weber ........................ | | 177/126 |

*Primary Examiner*—Richard B. Wilkinson
*Assistant Examiner*—George H. Miller, Jr.
*Attorney*—Edward C. Threedy

ABSTRACT: An economical portable letter postage scale having a support for a counterweight, the support being formed from a relatively flat sheet of material suspended from a handle at one corner thereof and relative to which handle the sheet pivots under action of the counterweight to dispose an envelope holder pivotally carried by the sheet, to a position of registration with a scale calibration on the sheet to designate the weight of such envelope and its contents and thereby determine the required postage.

PATENTED AUG 17 1971 3,599,738

INVENTOR
CHESTER H. WICKENBERG
Edward C. Shreedy
HIS ATTORNEY.

PORTABLE LETTER POSTAGE SCALE

Summary of the Invention

The principal object of this invention is the provision of a portable letter postage scale which is held in the hand of the user by means of a handle providing a fingerpiece and which scale utilizes a standard minted coin such, for example, a five-cent piece, as a counterweight to pivot a sheet to dispose an envelope holder in the form of an elongated rod, into registration with a scale calibration on the sheet to designate the weight of the envelope and its contents and from a reading of which scale the required postage may be determined.

Corollary to this object is the provision of a postage scale of the character herein described which may be most economically manufactured to afford distribution thereof for advertising purposes and the like, such as the advertise the business or product of a manufacturer or vendor.

I contemplate accomplishing the objects of this invention by the preferred form of construction shown in the accompanying drawings, and in which.

Figure 1:
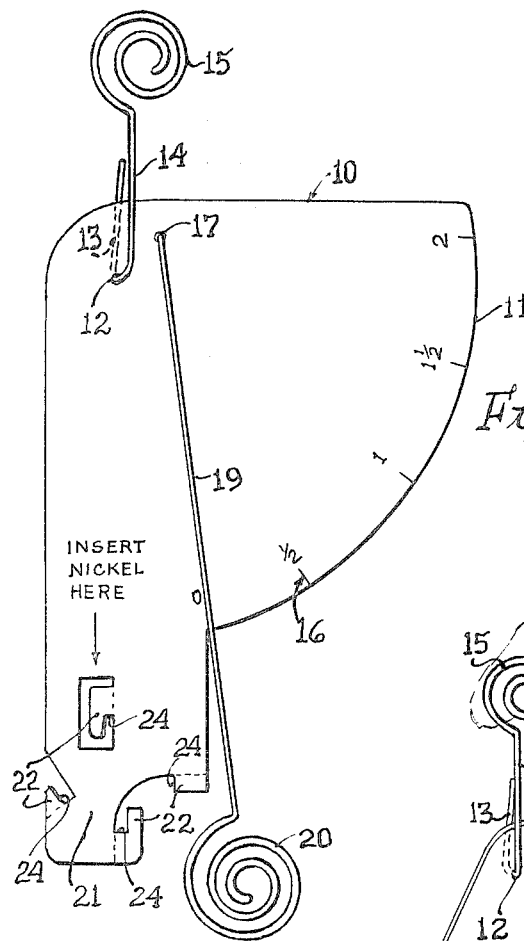
FIG. 1 is an elevational view of the postage scale embodying my invention.

To carry out the objects of my invention and to provide a portable postage scale for the purposes herein set forth, I provide a relatively flat sheet 10 which may be formed of cardboard or any suitable durable material. The sheet 10 has an arcuate edge 11 defined by a radius extending from a point indicated at 12, which is an opening formed in the sheet 10. Extending through this opening 12 is the bent end portion 13 of the shank 14 of a handle, the opposite end of which is spirally curled to provide a fingerpiece 15, which, which when grasped between the fingers of the hand of the user, will support the sheet 10 for pivotal movement about the bent end portion 13 of the shank 14.

The arcuate edge portion 11 is defined by scale calibrations 16 including indicia designating fractions of weight in ounces, in the present instance the scale indicating 0, ½, 1, 1½, and 2 ounces. THe calibrations may be changed according to the weight of the counterweight intended for use in the scale, which counterweight is hereinafter referred to.

Formed in the sheet 10 adjacent the opening 12 is an opening 17 through which extends the bent end portion 18 of a wire length providing a rod 19 extending over the adjacent face of the sheet 10 and beyond the scale 16 appearing thereon. The lower end portion of the rod 19 is formed into the shape of a clip 20. This is accomplished by forming a concentric spiral in the lower end portion of the rod 19.

In the sheet 10 at the lower portion 21 thereof, there is formed a counterweight holder. This holder is provided by L-shaped tabs 22 struck from the sheet 10 and circumferentially disposed to embrace a counterweight 23 disposed within notches 24 provided by the tabs 22.

The counterweight 23 is preferably in the form of a standard minted coin, such as a five-cent piece, and which is of a weight indicated by the scale 16, in the present instance, 2 ounces.

Figure 2:
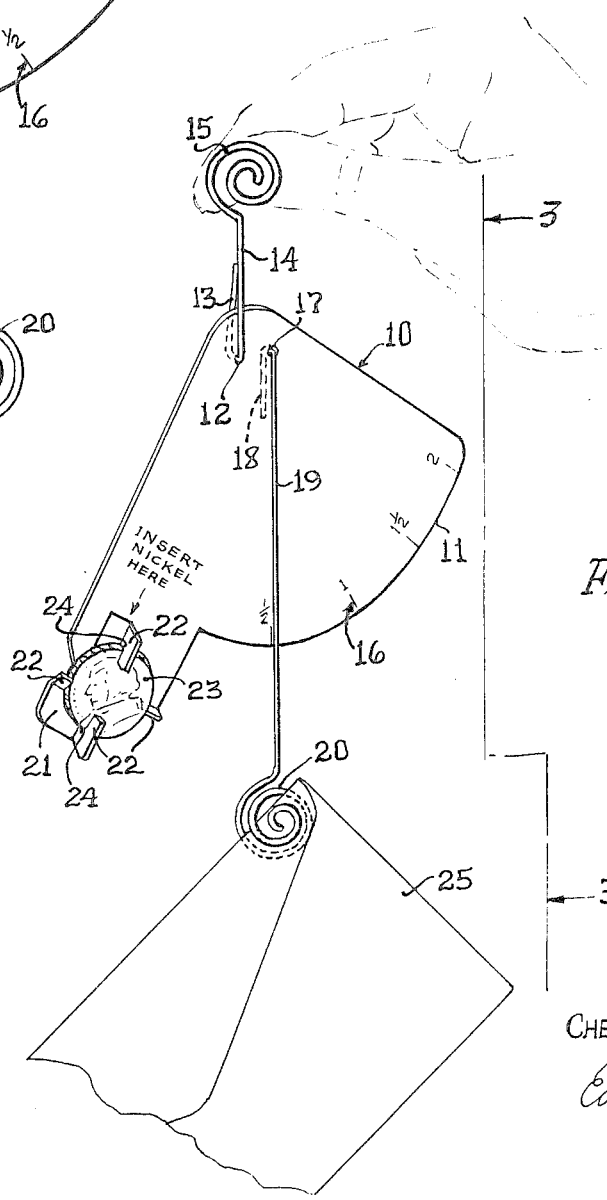
FIG. 2 is an elevational view of the postage scale illustrated in FIG. 1 showing the same in use in weighing an envelope and its contents.
Figure 3:
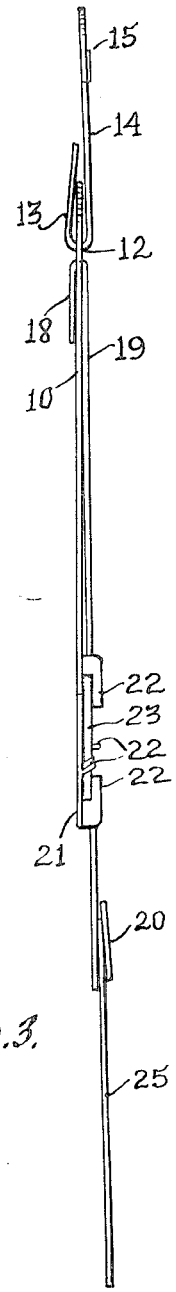
FIG. 3 is an edge view of the invention taken on line 3-3 of FIG. 2.

In using the scale, the user mounts the counterweight in the holder provided by the tabs 22 and notches 24, inserts the envelope in the clip 20, and suspends the scale by holding the fingerpiece 15 (as shown in FIG. 2), thus causing the sheet 10 to pivot about the bent end portion 13 to dispose the rod 19 in registration with the scale calibration on the scale 16 corresponding to the weight of the envelope 25 and its contents. By observing the point of registration of the rod 19 with respect to the scale 16 and the indicia designating the weight, the user can ascertain the weight of the envelope and its contents and thus determine the amount of postage required.

From the foregoing description, it will be apparent that I have provided a portable postage scale which is simple in construction, economical in manufacture, and highly efficient in use.

Having thus described my invention, what I claim as new and desire to protect by Letters Patent is:

1. A portable postage scale comprising
   a. a relatively flat sheet having an arcuate edge portion on which is a scale calibration comprising weight-indicating indicia,
   b. a handle having a fingerpiece and having one end portion pivotally connected to a corner of said sheet,
   c. a rod having one end portion pivotally connected to said sheet adjacent the pivotal connection between the sheet and the handle and extending in a coplanar relationship with respect to the sheet,
   d. an envelope holder formed in the opposite end of said rod for removably connecting an envelope to the rod for suspension therefrom,
   e. and a counterweight consisting of a standard minted coin and a holder therefor formed in said sheet in a corner portion thereof opposite the first mentioned corner portion of said sheet,
   f. said sheet being adapted to be pivoted relative to said handle and beneath said rod by a counterweight disposed in said counterweight holder, to dispose said rod in registration with an indicium on said scale calibration.

2. The portable postage scale defined in claim 1 wherein the counterweight holder comprises concentrically arranged tabs struck from said sheet.

3. The portable postage scale defined in claim 1 wherein the fingerpiece is defined by a flat spirally wound end portion of said handle.

4. The portable postage scale defined by claim 3 wherein the counterweight holder comprises concentrically arranged tabs struck from said sheet.

5. The portable postage scale defined in claim 1 wherein the envelope holder is a clip provided by a flat spirally wound end portion of said rod.

6. The portable postage scale defined by claim 3 wherein the counterweight holder comprises concentrically arranged tabs struck from said sheet.